US009880368B2

(12) United States Patent
Debban et al.

(10) Patent No.: US 9,880,368 B2
(45) Date of Patent: Jan. 30, 2018

(54) METHOD FOR HIGH SPEED PROCESSING OF PARTIALLY BONDED RIBBON STRUCTURES

(71) Applicant: OFS Fitel, LLC, Norcross, GA (US)

(72) Inventors: Harold P Debban, Snellville, GA (US); Timothy Goddard, Newnan, GA (US); Heng Ly, Stone Mountain, GA (US); Peter A. Weimann, Atlanta, GA (US)

(73) Assignee: OFS FITEL, LLC, Norcruss, GA (US)

( * ) Notice: Subject to any disclaimer, the term of this patent is extended or adjusted under 35 U.S.C. 154(b) by 0 days.

(21) Appl. No.: 15/416,370

(22) Filed: Jan. 26, 2017

(65) Prior Publication Data

US 2017/0219792 A1    Aug. 3, 2017

Related U.S. Application Data

(60) Provisional application No. 62/290,079, filed on Feb. 2, 2016.

(51) Int. Cl.
  *G02B 6/44*    (2006.01)
(52) U.S. Cl.
  CPC ......... *G02B 6/4403* (2013.01); *G02B 6/4405* (2013.01); *G02B 6/448* (2013.01)
(58) Field of Classification Search
  None
  See application file for complete search history.

(56) References Cited

U.S. PATENT DOCUMENTS

| | | | | |
|---|---|---|---|---|
| 5,485,539 | A * | 1/1996 | Mills .................... | G02B 6/4482 347/4 |
| 6,584,257 | B1 * | 6/2003 | Hurley .................... | G02B 6/44 385/109 |
| 2011/0110635 | A1 * | 5/2011 | Toge .................... | G02B 6/4403 385/102 |
| 2014/0016905 | A1 * | 1/2014 | Tanabe ................. | G02B 6/4405 385/114 |
| 2015/0346445 | A1 * | 12/2015 | Blazer .................. | G02B 6/4403 385/114 |
| 2017/0031121 | A1 * | 2/2017 | Blazer .................. | G02B 6/4404 |
| 2017/0219790 | A1 * | 8/2017 | Debban ................ | G02B 6/4284 |

FOREIGN PATENT DOCUMENTS

JP   2003-241041 A  *  8/2003
JP   2014-10439 A   *  1/2014

* cited by examiner

*Primary Examiner* — Mike Stahl
(74) *Attorney, Agent, or Firm* — Smith Tempel Blaha LLC

(57) ABSTRACT

Embodiments of the invention include a method for making a partially bonded optical fiber ribbon. The method includes providing a linear array of optical fibers, and applying with an ink jet printing machine a bonding matrix material to at least a portion of at least two adjacent optical fibers. The applied bonding matrix material has a viscosity of approximately 2.0 to approximately 10.0 centipoise (cP) measured at 25 degrees Celsius (° C.). The applied bonding matrix material also has a conductivity of approximately 600 to approximately 1200 millimhos (mmhos). The applied bonding matrix material also has an adhesion of approximately 0.01 to approximately 0.20 Newtons (N). Also, the bonding matrix material is applied to at least a portion of at least two adjacent optical fibers in such a way that the linear array of optical fibers forms a partially bonded optical fiber ribbon.

14 Claims, 6 Drawing Sheets

METHOD FOR HIGH SPEED PROCESSING OF PARTIALLY BONDED RIBBON STRUCTURES

STATEMENT REGARDING RELATED APPLICATIONS

This patent application claims priority under 35 U.S.C. § 119(e) to U.S. Provisional Patent Application Ser. No. 62/290,079, filed on Feb. 2, 2016, entitled, "High Speed Processing Of Partially-Bonded Ribbon," the entire contents of which are hereby incorporated by reference.

BACKGROUND OF THE INVENTION

Field of Invention

The invention relates to optical fibers. More particularly, the invention relates to partially bonded optical fiber ribbon structures and high speed processing methods for making partially bonded optical fiber ribbon structures.

Description of Related Art

Mass fusion splicing makes the use of optical fiber ribbons attractive in relatively very high fiber count cable structures, as this technology allows the splicing of 12 ribbonized fibers in approximately the same amount of time as is required to splice two or three individual fibers. Optical fiber ribbons are optical fibers bonded together as a (typically) flat ribbon of optical fibers. There are now market requirements for cables having at least 1000 to 5000 optical fibers.

The cabling of conventional flat optical fiber ribbons becomes more problematic as the number of flat optical fiber ribbons being cabled increases. Conventionally, flat optical fiber ribbons are grouped into rectangular arrays, often referred to as stacks, and positioned within a cable structure. However, optical fiber cables usually need to be circular to be easily installed. Thus, the square peg, i.e., the rectangular ribbon stack, must fit in the round hole, i.e., the circular cable structure. Such conventional configurations lead to empty space in the cable structure.

Some existing optical fiber cable manufacturers have developed a partially bonded optical fiber ribbon, also referred to as a rollable ribbon, where the optical fibers forming the optical fiber ribbon are not bonded over their entire length. The optical fibers are bonded intermittently, thus allowing the optical fiber ribbon to be folded or rolled into an approximately cylindrical shape, allowing for better filling of the circular cable, resulting in more optical fibers to be included in a given cable diameter compared to optical fiber cables with conventional fully bonded ribbon structures.

However, conventional methods for producing partially bonded optical fiber ribbon structures often are more complex than conventional methods for producing conventional flat optical fiber ribbon structures. For example, in conventional methods for producing partially bonded optical fiber ribbon structures, the application or placement of the bonding agent (i.e., bonding matrix material) at proper locations on the optical fiber ribbons, as well as the proper amount of bonding matrix material that needs to be applied to the optical fiber ribbons, are relatively difficult to determine compared to conventional methods for producing flat optical fiber ribbon structures because the location and amount of bonding matrix material used in producing partially bonded optical fiber ribbon structures greatly affects the integrity of the partially bonded optical fiber ribbon structures.

For example, improper placement of the bonding matrix material on an optical fiber ribbon often leads to inadequate bonding between adjacent optical fibers, resulting in an unsuitably loose partially bonded optical fiber ribbon structure. Also, an insufficient amount of bonding matrix material applied to an optical fiber ribbon often causes the resulting partially bonded optical fiber ribbon structure to have too many loose optical fibers. However, applying too much bonding matrix material to an optical fiber ribbon often causes the resulting partially bonded optical fiber ribbon structure to become too rigid, thus making the structure relatively difficult or even impossible to roll or fold adequately for compact packaging within a cable structure. Because of these difficulties associated with conventional methods for producing partially bonded optical fiber ribbon structures, processing speeds and ribbon structure fiber counts typically are relatively low compared to methods for producing conventional flat optical fiber ribbon structures. For example, many conventional methods for producing partially bonded optical fiber ribbon structures typically can only produce 8-fiber or less partially bonded optical fiber ribbon structures.

SUMMARY OF THE INVENTION

The invention is embodied in a method for making a partially bonded optical fiber ribbon. The method includes providing a linear array of optical fibers, and applying with an ink jet printing machine a bonding matrix material to at least a portion of at least two adjacent optical fibers. The applied bonding matrix material has a viscosity of approximately 2.0 to approximately 10.0 centipoise (cP) measured at 25 degrees Celsius (° C.). The applied bonding matrix material also has a conductivity of approximately 600 to approximately 1200 millimhos (mmhos). The applied bonding matrix material also has an adhesion of approximately 0.01 to approximately 0.20 Newtons (N). Also, the bonding matrix material is applied to at least a portion of at least two adjacent optical fibers in such a way that the linear array of optical fibers forms a partially bonded optical fiber ribbon.

DETAILED DESCRIPTION OF EXEMPLARY EMBODIMENTS

Figure 1A:
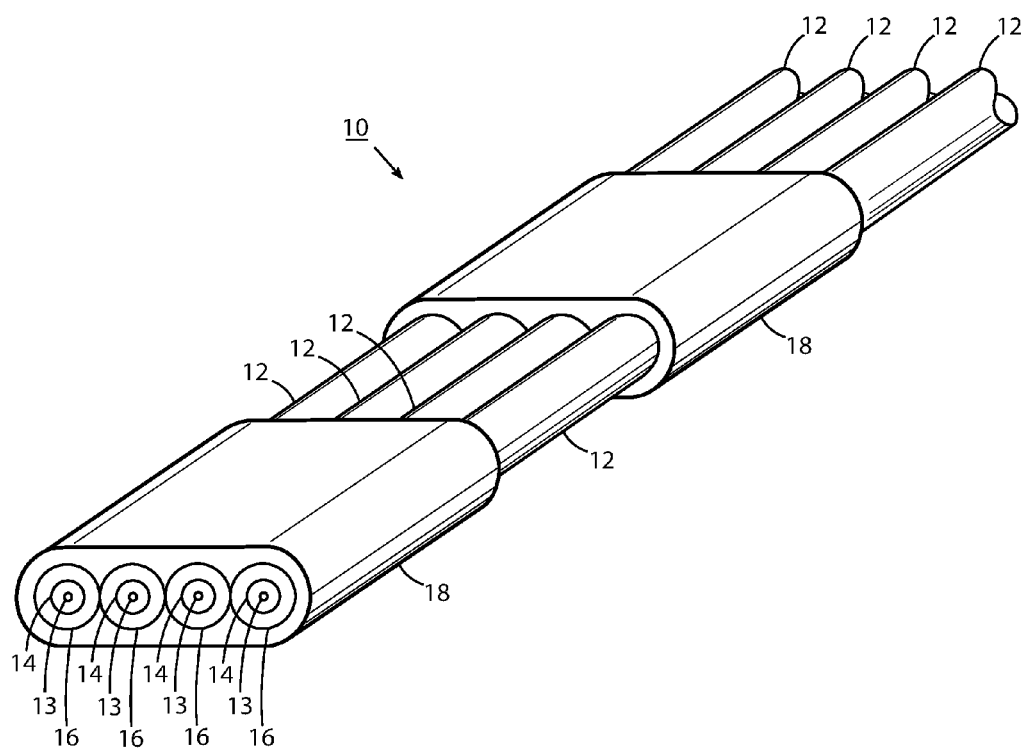
FIG. 1A is a perspective view of a conventional partially bonded optical fiber ribbon.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

FIG. 1A is a perspective view of a conventional partially bonded optical fiber ribbon 10. As shown, the ribbon 10 includes a plurality of optical fibers 12, with each optical fiber 12 having a core portion 13, a cladding portion 14 surrounding the core portion 13, and a coating portion 16 surrounding the cladding portion 14. The core portion 13 and the cladding portion 14 are made of glass. The coating portion 16, which is made of plastic or an ultraviolet (UV) curable acrylate material, protects the core portion 13 and the cladding portion 14 from breaking. In this optical fiber ribbon 10, the periphery of the optical fibers 12 are intermittently covered with a ribbon matrix portion 18, if the matrix material is relatively soft but tough.

Figure 1B:
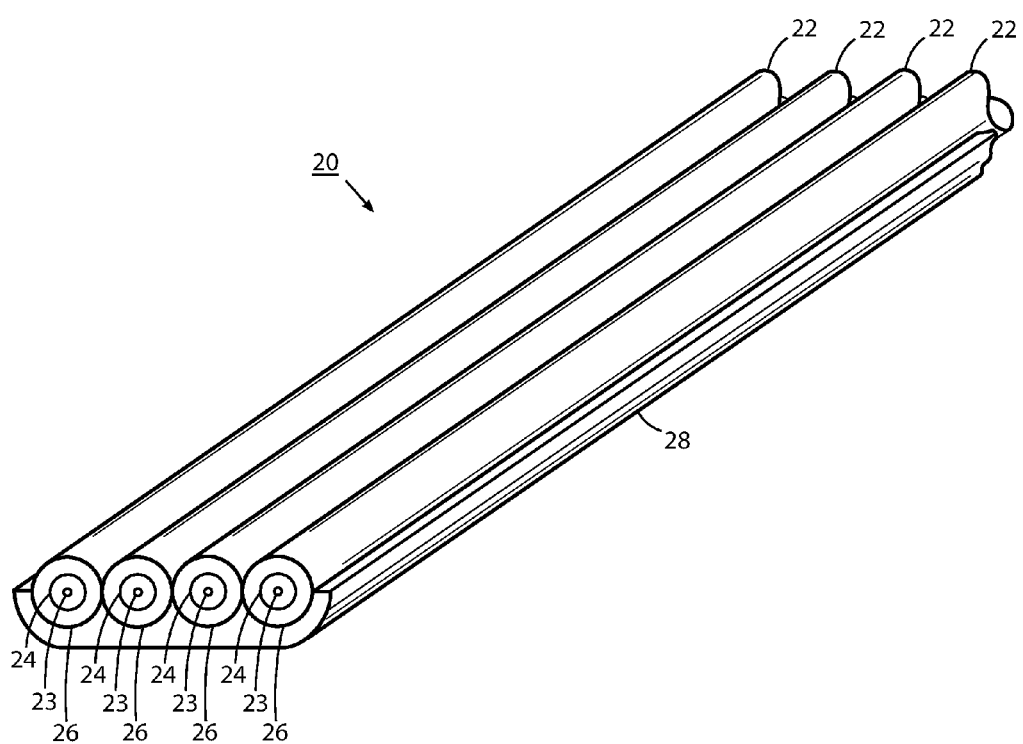
FIG. 1B is a perspective view of another conventional partially bonded optical fiber ribbon.

FIG. 1B is a perspective view of another conventional partially bonded optical fiber ribbon 20. The optical fiber ribbon 20 in FIG. 1B includes a plurality of optical fibers 22, with each optical fiber 22 having a core portion 23, a cladding portion 24 surrounding the core portion 23, and a coating portion 26 surrounding the cladding portion 24. In this optical fiber ribbon 20, a portion of the periphery of the optical fibers 22 are covered with a ribbon matrix portion 28 along the entire length of the optical fibers 22, if the matrix material is relatively soft but tough.

Figure 1C:
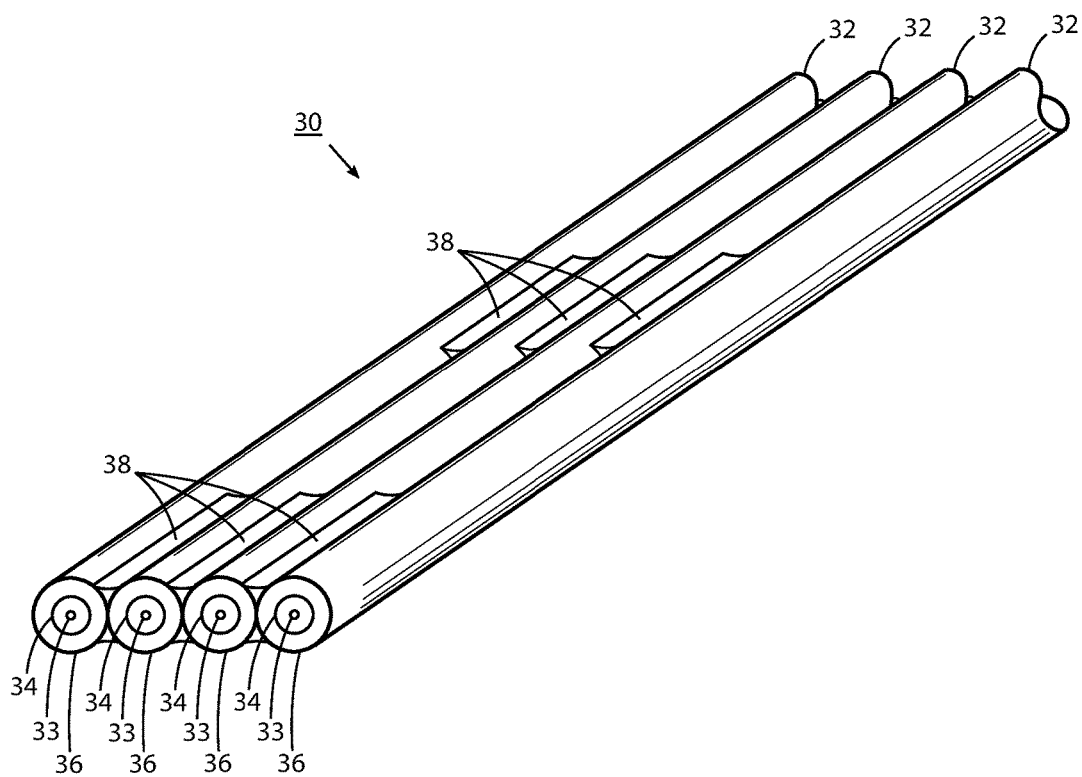
FIG. 1C is a perspective view of yet another conventional partially bonded optical fiber ribbon.

FIG. 1C is a perspective view of yet another conventional partially bonded optical fiber ribbon 30. The optical fiber ribbon 30 in FIG. 1C includes a plurality of optical fibers 32, with each optical fiber 32 having a core portion 33, a cladding portion 34 surrounding the core portion 33, and a coating portion 36 surrounding the cladding portion 34. In this optical fiber ribbon 30, a portion of the periphery of the optical fibers 32 are intermittently covered with a ribbon matrix portion 38. As shown, the ribbon matrix portions 38 are uniformly displaced along the periphery of the optical fibers 32. The optical fiber ribbon 30 can be made by applying dots of matrix material in a pattern before curing, slicing a standard ribbon very precisely with a blade, or inserting pins to intermittently block the flow of liquid prepolymer matrix material.

As discussed hereinabove, conventional partially bonded optical fiber ribbons, also referred to as rollable ribbons, are bonded together with a relatively precise amount of bonding matrix material at relatively precise locations of the optical fibers. Improper placement of the bonding matrix material on one or more optical fibers within the optical fiber ribbon often leads to inadequate bonding between adjacent optical fibers, resulting in an unsuitably loose partially bonded optical fiber ribbon structure. Applying an insufficient amount of bonding matrix material to one or more optical fibers within the optical fiber ribbon often causes the resulting partially bonded optical fiber ribbon structure to have too many loose optical fibers. However, applying too much bonding matrix material to one or more optical fibers within the optical fiber ribbon often causes the resulting partially bonded optical fiber ribbon structure to become too rigid, thus making the ribbon structure relatively difficult or even impossible to roll or fold adequately for compact packaging within a cable structure.

Compared to conventional methods for producing conventional flat optical fiber ribbon structures, the inability of conventional methods for producing partially bonded optical fiber ribbon structures to reliably apply an accurate amount of bonding matrix material at relatively precise locations of the optical fiber ribbon has resulted in unsuitably slow processing speeds and low ribbon structure fiber counts.

According to embodiments of the invention, the combination of an appropriate device for applying bonding matrix material to relatively precise locations of the optical fiber ribbon, such as an ink jet printing machine, and the use of a bonding matrix material having particular properties, provides methods for producing partially bonded optical fiber ribbon structures at relatively high processing speeds and that typically have up to 24 optical fiber ribbons per ribbon structure.

According to embodiments of the invention, the use of an ink jet printing machine or other suitable means to apply bonding matrix material to relatively precise locations of a linear array of optical fibers allows for processing speeds of up to approximately 500 meters per minute for producing partially bonded optical fiber ribbon structures. However, to achieve such processing speeds, the bonding matrix material should have certain properties.

According to embodiments of the invention, the bonding matrix material should have a viscosity of approximately 2.0 to 10.0 centipoise (cP) measured at 25 degrees Celsius (° C.) for proper flow speed using an ink jet printing machine or other appropriate means for applying the bonding matrix material to relatively precise locations of a linear array of optical fibers. Also, according to embodiments of the invention, the bonding matrix material should have a conductivity of approximately 600 to 1200 millimhos (mmhos) and an adhesion of approximately 0.01 to approximately 0.20 Newtons (N) for the bonding matrix material to be printed or applied to a linear array of optical fibers at suitably precise locations and in a manner that allows for processing speeds of up to approximately 500 meters per minute for producing the partially bonded optical fiber ribbon structures. The adhesion of the bonding matrix material, which generally is the force needed to separate an optical fiber from the optical fiber ribbon structure, can be measured by separating an optical fiber from partially bonded optical fiber ribbon structure.

According to embodiments of the invention, combining the use of a bonding matrix material having a viscosity of approximately 2.0 to 10.0 cps, a conductivity of approximately 600 to 1200 mmhos, and an adhesion of approximately 0.01 to 0.20 N, with the use of an ink jet printing machine or other suitable means to apply the bonding matrix material to relatively precise locations of one or more optical fibers within the optical fiber ribbon structure allows for partially bonded optical fiber ribbon structures having up to 24 optical fiber ribbons per structure to be produced at processing speeds of up to approximately 500 meters per minute.

The bonding matrix material can be any suitable material that bonds together a linear array of optical fibers into an optical fiber ribbon, and that includes the properties described hereinabove. For example, the bonding matrix material can be any suitable ultraviolet curable resin, thermosetting resin, thermoplastic resin, or other suitable bonding matrix material.

Figure 2:
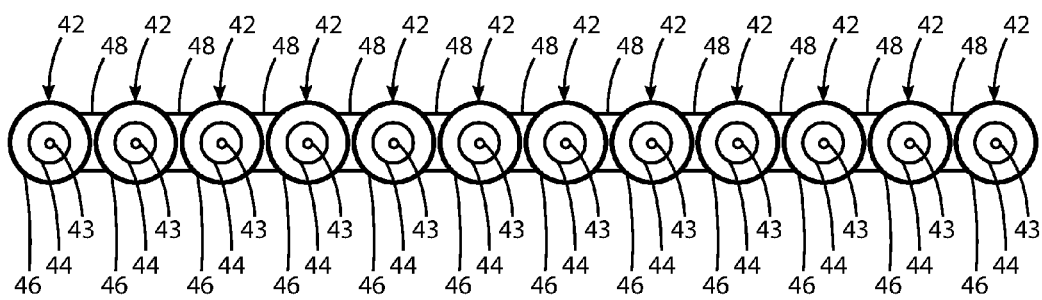
FIG. 2 is a partial, cross-sectional view of a partially bonded optical fiber ribbon structure, according to embodiments of the invention.

FIG. 2 is a partial, cross-sectional view of a partially bonded optical fiber ribbon structure 40, according to embodiments of the invention. The optical fiber ribbon structure 40 includes a linear array of optical fibers 42, with each optical fiber 42 having a core portion 43, a cladding portion 44 surrounding the core portion 43, and a coating portion 46 surrounding the cladding portion 44. The core portion 43 and the cladding portion 44 are made of glass. The coating portion 46, which is made of plastic or an ultraviolet (UV) curable acrylate material, protects the core portion 43 and the cladding portion 44 from breaking. The linear array of optical fibers 42 can include any suitable number of optical fibers, e.g., 12 fibers (as shown) or up to 24 fibers. The partially bonded optical fiber ribbon structure 40 typically has a dimension of 0.25×3.0 millimeters (mm) for a 12-fiber ribbon, compared to a typical dimension of 0.33×3.2 mm for a conventional 12-fiber flat optical fiber ribbon.

In the optical fiber ribbon structure 40, portions of the periphery of adjacent optical fibers 42 are covered with a bonding matrix material 48. The bonding matrix material 48 can be applied to portions of the periphery of adjacent optical fibers 42 in any suitable pattern. However, according to embodiments of the invention, the bonding matrix material applied to portions of the periphery of adjacent optical fibers 42 should be dense enough to cause the resulting partially bonded optical fiber ribbon structure 40 to be able to lay substantially flat. Also, according to embodiments of the invention, the bonding matrix material applied to portions of the periphery of adjacent optical fibers 42 should be sparse enough to allow the resulting partially bonded optical fiber ribbon structure 40 to be able to be rolled into a substantially circular shape.

Figure 3:
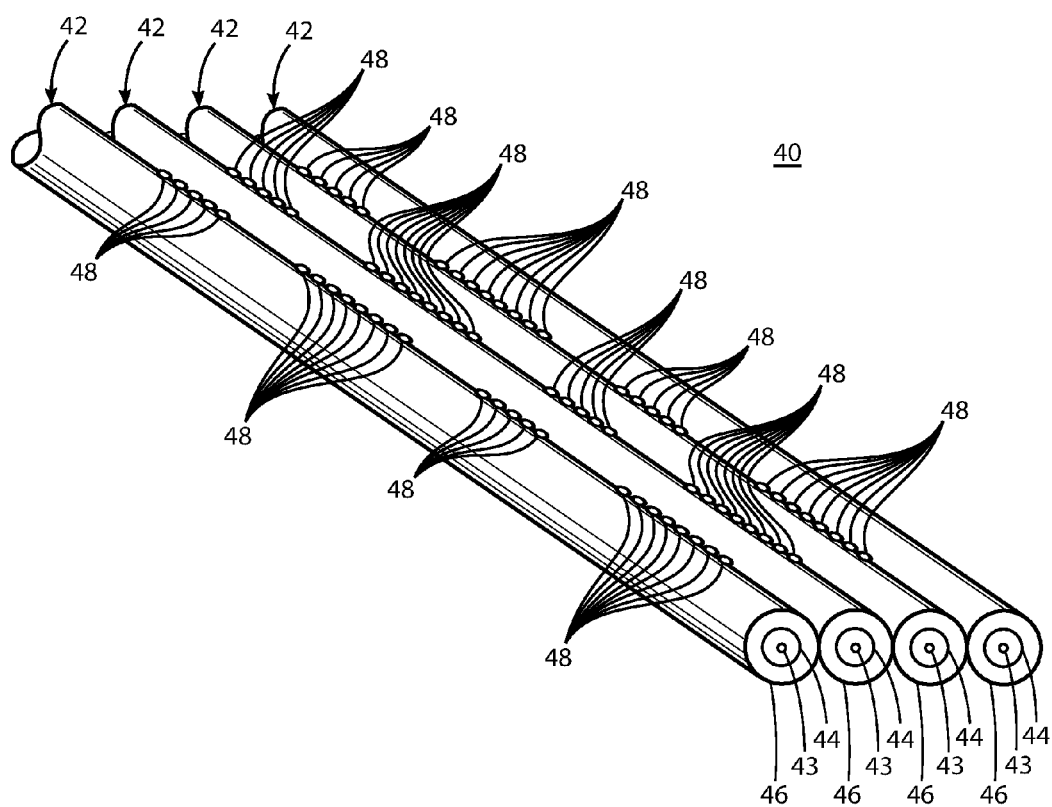
FIG. 3 is a perspective view of the partially bonded optical fiber ribbon structure of FIG. 2, according to embodiments of the invention.

FIG. 3 is a perspective view of the partially bonded optical fiber ribbon structure 40 of FIG. 2, according to embodiments of the invention. As shown, the bonding matrix material 48 can be applied across a portion of any two (or more) adjacent optical fibers 42 within the linear array of optical fibers 42 at relatively precise locations along the length of the adjacent optical fibers 42. The bonding matrix material 48 can be applied in any suitable pattern or series of patterns across or between any two (or more) adjacent optical fibers 42 within the linear array of optical fibers 42, and along the length of the adjacent optical fibers 42.

For example, the bonding matrix material 48 is applied as one or more dots or filaments across any two or more adjacent optical fibers 42 within the linear array of optical fibers 42. Also, according to embodiments of the invention, the dots or filaments of bonding matrix material 48 are applied to relatively precise locations of the linear array of optical fibers 42 and in relatively proper amounts, as the result of an ink-jet printing machine or other suitable means applying dots or filaments of bonding matrix material 48 to precise and proper locations of the linear array of optical fibers 42. Also, as shown, the dots or filaments of bonding matrix material 48 can be applied periodically or continuously along the length of one or more portions of the linear array of optical fibers 42.

According to embodiments of the invention, the bonding matrix material is applied to the linear array of optical fibers at a minimum density of 1 dot of bonding matrix material per 25 millimeters of fiber array surface area. Preferably, the bonding matrix material is applied to the linear array of optical fibers in a manner that provides an average of at least one dot of bonding matrix material per 15 millimeters of fiber array surface area, with a near normal distribution of dots of bonding matrix material. However, the distance between adhesive dots of bonding matrix material should be no more than 100 millimeters.

Figure 4:
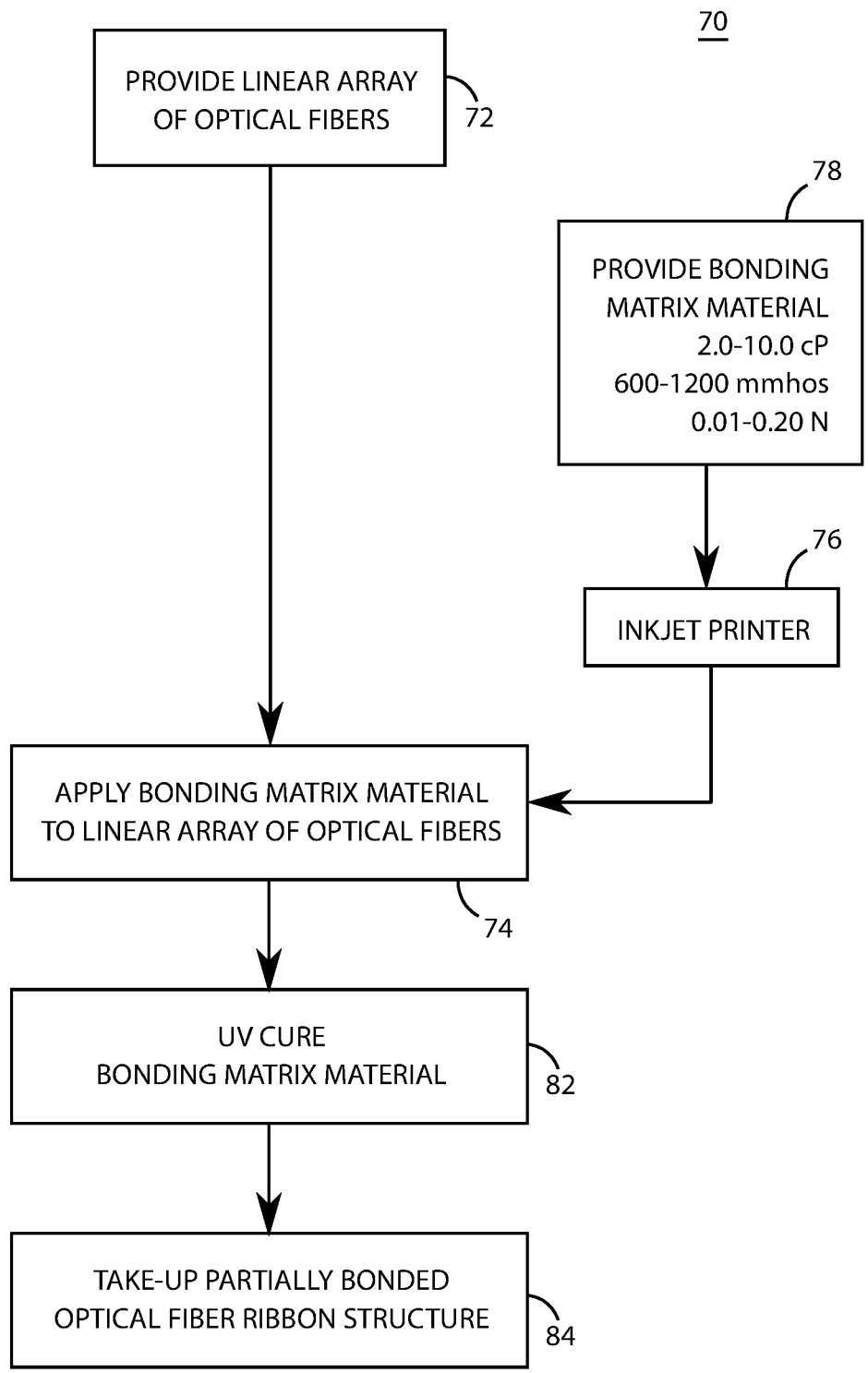
FIG. 4 is a flow diagram of a method for making a partially bonded optical fiber ribbon structure, according to embodiments of the invention.

FIG. 4 is a flow diagram of a high speed processing method 70 for making a partially bonded optical fiber ribbon structure, according to embodiments of the invention. As discussed hereinabove, according to embodiments of the invention, combining the use of a bonding matrix material having a viscosity of approximately 2.0 to 10.0 cps, a conductivity of approximately 600 to 1200 mmhos, and an adhesion of approximately 0.01 to 0.20 N, with the use of an ink jet printing machine or other suitable means to apply the bonding matrix material to relatively precise locations of one or more optical fibers within the optical fiber ribbons allows for partially bonded optical fiber ribbon structures having up to 24 optical fiber ribbons per structure to be produced at processing speeds of up to approximately 500 meters per minute.

The method 70 includes a step 72 of providing a linear array of optical fibers. The linear array of optical fibers can include any suitable number of optical fibers, e.g., 12 fibers or up to 24 fibers.

The method 70 also includes a step 74 of applying a bonding matrix material to at least a portion of two or more adjacent optical fibers of the linear array of optical fibers. As discussed hereinabove, the bonding matrix material is applied in any suitable pattern or series of patterns across a portion of two or more adjacent optical fibers in such a way that the linear array of optical fibers forms a partially bonded optical fiber ribbon.

According to embodiments of the invention, the bonding matrix material is applied across one or more portions of two or more adjacent optical fibers of the linear array of optical fibers in such a way that the bonding matrix material is dense enough to allow the resulting partially bonded optical fiber ribbon to be able to lay substantially flat. Also, the bonding matrix material is applied across one or more portions of two or more adjacent optical fibers of the linear array of optical fibers in such a way that the bonding matrix material is sparse enough to allow the resulting partially bonded optical fiber ribbon to be rolled into a substantially circular shape.

The method 70 also includes a step 76 of applying the bonding matrix material across one or more portions of two or more adjacent optical fibers of the linear array of optical fibers using an ink-jet printer or printing machine, or other suitable means. For example, the bonding matrix material can be applied across one or more portions of two or more adjacent optical fibers of the linear array of optical fibers using a PrintSafe or VideoJet printing machine. As discussed hereinabove, using an ink-jet printer or printing machine to apply the bonding matrix material to relatively precise locations of the linear array of optical fibers allows for processing speeds of up to approximately 500 meters per minute for producing partially bonded optical fiber ribbon structures.

The method 70 also includes a step 78 of providing a bonding matrix material having suitable properties to the ink-jet printer to allow the ink-jet printer or printing machine to apply the bonding matrix material to relatively precise locations on the linear array of optical fibers to allow for processing speeds of up to approximately 500 meters per minute for producing partially bonded optical fiber ribbon structures. As discussed hereinabove, according to embodiments of the invention, the bonding matrix material should have a viscosity of approximately 2.0 to 10.0 centipoise (cP) measured at 25 degrees Celsius (° C.), a conductivity of approximately 600 to 1200 millimhos (mmhos), and an adhesion of approximately 0.01 to approximately 0.20 Newtons (N) for proper flow speed using an ink jet printing machine.

The method 70 also includes a step 82 of curing the applied bonding matrix material in an ultraviolet (UV) curing oven or other suitable device. Once the bonding matrix material has been applied to the linear array of optical fibers, the linear array of optical fibers is passed through a UV curing oven or other suitable device to cure the boning matrix material.

The method 70 also includes a step 84 of taking up the partially bonded optical fiber ribbon structure on a take-up spool or other suitable device. Once the bonding matrix material applied to the linear array of optical fibers has been cured, the resulting partially bonded optical fiber ribbon structure is taken up on a take-up spool or other suitable device.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for making a partially bonded optical fiber ribbon, comprising:
    providing a linear array of optical fibers; and
    applying with an ink jet printing machine a bonding matrix material to at least a portion of at least two adjacent optical fibers,
    wherein the bonding matrix material has a viscosity of approximately 2.0 to approximately 10.0 centipoise (cP) measured at 25 degrees Celsius (° C.),
    wherein the bonding matrix material has a conductivity of approximately 600 to approximately 1200 millimhos (mmhos),
    wherein the bonding matrix material has an adhesion of approximately 0.01 to approximately 0.20 Newtons (N), and
    wherein the bonding matrix material is applied to at least a portion of at least two adjacent optical fibers in such a way that the linear array of optical fibers forms a partially bonded optical fiber ribbon.

2. The method as recited in claim 1, wherein the partially bonded optical fiber ribbon is made at a processing speed of up to approximately 500 meters per minute.

3. The method as recited in claim 1, wherein the partially bonded optical fiber ribbon comprises a linear array of up to 24 optical fibers partially bonded together.

4. The method as recited in claim 1, wherein the bonding matrix material is a material selected from the group consisting of an ultraviolet curable resin, a thermosetting resin, and a thermoplastic resin.

5. The method as recited in claim 1, wherein the bonding matrix material applied to at least a portion of at least two adjacent optical fibers is dense enough to cause the resulting partially bonded optical fiber ribbon to be able to lay substantially flat.

6. The method as recited in claim 1, wherein the bonding matrix material applied to at least a portion of at least two adjacent optical fibers is sparse enough to allow the resulting partially bonded optical fiber ribbon to be rolled into a substantially circular shape.

7. The method as recited in claim 1, wherein applying the bonding matrix material to at least a portion of at least two adjacent optical fibers further comprises applying filaments or dots of the bonding matrix material across two or more adjacent optical fibers within the linear array of optical fibers along the length of the two or more adjacent optical fibers.

8. A partially bonded optical fiber ribbon, comprising:
    a plurality of optical fibers arranged adjacent to one another in a linear array; and
    bonding matrix material applied by an ink jet printing machine to at least a portion of at least two adjacent optical fibers,
    wherein the bonding matrix material has a viscosity of approximately 2.0 to approximately 10.0 centipoise (cP) measured at 25 degrees Celsius (° C.),
    wherein the bonding matrix material has a conductivity of approximately 600 to approximately 1200 millimhos (mmhos),
    wherein the bonding matrix material has an adhesion of approximately 0.01 to approximately 0.20 Newtons (N), and
    wherein the matrix material is applied to at least a portion of at least two adjacent optical fibers in such a way that the linear array of optical fibers forms a partially bonded optical fiber ribbon.

9. The partially bonded optical fiber ribbon as recited in claim 8, wherein the partially bonded optical fiber ribbon is made at a processing speed of up to approximately 500 meters per minute.

10. The partially bonded optical fiber ribbon as recited in claim 8, wherein the partially bonded optical fiber ribbon comprises a linear array of up to 24 optical fibers partially bonded together.

11. The partially bonded optical fiber ribbon as recited in claim 8, wherein the bonding matrix material is a material selected from the group consisting of an ultraviolet curable resin, a thermosetting resin, and a thermoplastic resin.

12. The partially bonded optical fiber ribbon as recited in claim 8, wherein the bonding matrix material applied to at least a portion of at least two adjacent optical fibers is dense enough to cause the resulting partially bonded optical fiber ribbon to be able to lay substantially flat.

13. The partially bonded optical fiber ribbon as recited in claim 8, wherein the bonding matrix material applied to at least a portion of at least two adjacent optical fibers is sparse enough to allow the resulting partially bonded optical fiber ribbon to be rolled into a substantially circular shape.

14. The partially bonded optical fiber ribbon as recited in claim 8, wherein applying the bonding matrix material to at least a portion of at least two adjacent optical fibers further comprises applying filaments or dots of the bonding matrix material across two or more adjacent optical fibers within the linear array of optical fibers along the length of the two or more adjacent optical fibers.

\* \* \* \* \*